United States Patent
Shah et al.

(10) Patent No.: US 8,095,436 B1
(45) Date of Patent: Jan. 10, 2012

(54) METHOD, GRAPHICAL USER INTERFACE, AND SYSTEM FOR CATEGORIZING FINANCIAL RECORDS

(75) Inventors: Rupesh Shah, Mountain View, CA (US); Gordon Whitten, Omaha, NE (US); Scott Sanchez, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 1085 days.

(21) Appl. No.: 11/444,578

(22) Filed: May 31, 2006

(51) Int. Cl.
*G07B 17/00* (2006.01)
*G07F 19/00* (2006.01)
(52) U.S. Cl. ......................................... 705/30
(58) Field of Classification Search .................. None
See application file for complete search history.

(56) References Cited

U.S. PATENT DOCUMENTS

| | | | | |
|---|---|---|---|---|
| 5,842,185 A | * | 11/1998 | Chancey et al. | 705/40 |
| 2005/0203885 A1 | * | 9/2005 | Chenevich et al. | 707/3 |
| 2005/0274792 A1 | * | 12/2005 | Hahn-Carlson et al. | 235/379 |
| 2007/0005509 A1 | * | 1/2007 | Spiller et al. | 705/65 |

OTHER PUBLICATIONS

Personal Mvelopes, "Automatic Transaction Retrieval", www.mvelopes.com, In2M Corporation, May 31, 2005, (2 pages).

* cited by examiner

*Primary Examiner* — Ryan Zeender
*Assistant Examiner* — Paul Danneman
(74) *Attorney, Agent, or Firm* — Osha • Liang LLP (57) ABSTRACT

A method for categorizing financial records involves obtaining multiple financial records from a financial institution. Each financial record in the multiple financial records is categorized using a category selected from multiple categories, where the multiple categories include multiple business-related categories and at least one non-business-related category. Each financial record categorized using a business-related category selected from the multiple business-related categories is mapped to a tax category selected from multiple tax categories, where the tax category is associated with the business-related category. A financial report is generated that includes the tax category for each financial record categorized using one of the multiple business-related categories.

13 Claims, 9 Drawing Sheets

| Business-related categories 602 | Tax categories 652 |
|---|---|
| Promotions & contests<br>Broker fees | Advertising |
| Vehicle repairs<br>Vehicle registration<br>Gasoline | Car and truck expenses |
| Lumpers | Contract labor |
| Car insurance<br>Renter's insurance<br>Homeowner's insurance | Insurance (other than health) |
| Claims & damages<br>Client gifts<br>Education<br>Shipping & postage<br>Event registration fees | Office expense |
| Vehicle rental<br>Equipment rental | Rent or lease (vehicles, machinery, and equipment) |
| Office rental<br>Storage space | Rent or lease (other business property) |
| Showing expenses<br>Demonstration expenses | Supplies |
| Hotel<br>Airfare<br>Tolls/scales/prepass | Travel |
| Utilities | Utilities |

Table 600

604: Promotions & contests, Broker fees
606: Vehicle repairs, Vehicle registration, Gasoline
608: Lumpers
610: Car insurance, Renter's insurance, Homeowner's insurance
612: Claims & damages, Client gifts, Education, Shipping & postage, Event registration fees
614: Vehicle rental, Equipment rental
616: Office rental, Storage space
618: Showing expenses, Demonstration expenses
620: Hotel, Airfare, Tolls/scales/prepass
622: Utilities 654: Advertising
656: Car and truck expenses
658: Contract labor
660: Insurance (other than health)
662: Office expense
664: Rent or lease (vehicles, machinery, and equipment)
666: Rent or lease (other business property)
668: Supplies
670: Travel
672: Utilities

METHOD, GRAPHICAL USER INTERFACE, AND SYSTEM FOR CATEGORIZING FINANCIAL RECORDS

CROSS-REFERENCE TO RELATED APPLICATIONS

The subject matter of the present application may be related in part to subject matter contained in U.S. patent application Ser. No. 11/073,396, entitled "Categorization of Financial Transactions," filed on Mar. 4, 2005 in the names of Matt E. Hart, Gordon D. Whitten, Jr., Rupesh D. Shah, and Kevin M. Reeth II, the entire contents of which are incorporated herein by reference.

BACKGROUND

Small businesses face unique challenges when filing tax returns. Frequently, finances (i.e., income and/or expenses) for a small business are spread across multiple financial accounts (e.g., checking accounts, credit card accounts, money market accounts, or any other type of financial account). In such cases, consolidating finances from all of the financial accounts may be helpful to determine total financial amounts to be entered on a tax form for the small business.

Further, in many cases, one or more financial accounts is used not only for business finances, but also for personal finances (e.g., finances for a sole proprietor of the small business, or any other individual(s) associated with the small business). Accordingly, in preparation for a tax filing, it may be helpful to categorize financial records associated with the shared financial account(s), to determine which financial records are related to business finances, and which financial records are related to personal finances.

Additionally, for many or all of the financial records associated with the small business (i.e., financial records, from one or more financial accounts, that are not associated with personal finances), it may be necessary to determine to which tax categories the financial records apply. Proper categorization of financial records may impact the accuracy of the tax filing and/or any tax deductions applicable to the tax filing.

Typically, to categorize financial records for a small business, historical financial documents (e.g., receipts, invoices, ledgers, or any other physical financial documents) are maintained throughout the tax year. In preparation for a tax filing, the financial documents are then organized based on tax categories available on a tax form for the small business. This method of categorization depends heavily on reliable maintenance of the financial documents and good knowledge of the relationships between the financial documents and the available tax categories. Further, maintenance and/or categorization of the financial documents may be quite time-consuming.

SUMMARY

In general, in one aspect, the invention relates to a method for categorizing financial records, comprising obtaining a plurality of financial records from a financial institution, for each financial record in the plurality of financial records, categorizing the financial record using a category selected from a plurality of categories, wherein the plurality of categories comprises a plurality of business-related categories and at least one non-business-related category, for each financial record categorized using a business-related category selected from the plurality of business-related categories, mapping the financial record to a tax category selected from a plurality of tax categories, wherein the tax category is associated with the business-related category, and generating a financial report comprising the tax category for each financial record categorized using one of the plurality of business-related categories.

In general, in one aspect, the invention relates to a graphical user interface displaying a categorization interface on a display device, comprising a plurality of financial records from a financial institution, and for each financial record in the plurality of financial records, a category selector configured to associate the financial record with a category selected from a plurality of categories, wherein the plurality of categories comprises a plurality of business-related categories and at least one non-business-related category, wherein each financial record associated with a category selected from the plurality of business-related categories is mapped to a tax category selected from a plurality of tax categories, wherein the tax category is associated with the business-related category, and wherein a financial report is generated comprising the tax category for each financial record associated with one of the plurality of business-related categories.

In general, in one aspect, the invention relates to a system comprising a financial records collector configured to obtain a plurality of financial records from a financial institution, and a categorization interface configured to categorize each financial record in the plurality of financial records using a category selected from a plurality of categories, wherein the plurality of categories comprises a plurality of business-related categories and at least one non-business-related category, wherein each financial record categorized using a business-related category selected from the plurality of business-related categories is mapped to a tax category selected from a plurality of tax categories, wherein the tax category is associated with the business-related category, and wherein a financial report is generated comprising the tax category for each financial record categorized using one of the plurality of business-related categories.

In general, in one aspect, the invention relates to a computer readable medium comprising executable instructions for categorizing financial records by obtaining a plurality of financial records from a financial institution, for each financial record in the plurality of financial records, categorizing the financial record using a category selected from a plurality of categories, wherein the plurality of categories comprises a plurality of business-related categories and at least one non-business-related category, for each financial record categorized using a business-related category selected from the plurality of business-related categories, mapping the financial record to a tax category selected from a plurality of tax categories, wherein the tax category is associated with the business-related category, and generating a financial report comprising the tax category for each financial record categorized using one of the plurality of business-related categories.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and graphical user interface to categorize financial records. Financial records from one or more financial institutions are categorized as business-related or non-business-related. Business-related categories are mapped to tax categories, and the categorizations and/or mappings are used to generate a financial report.

Figure 1:
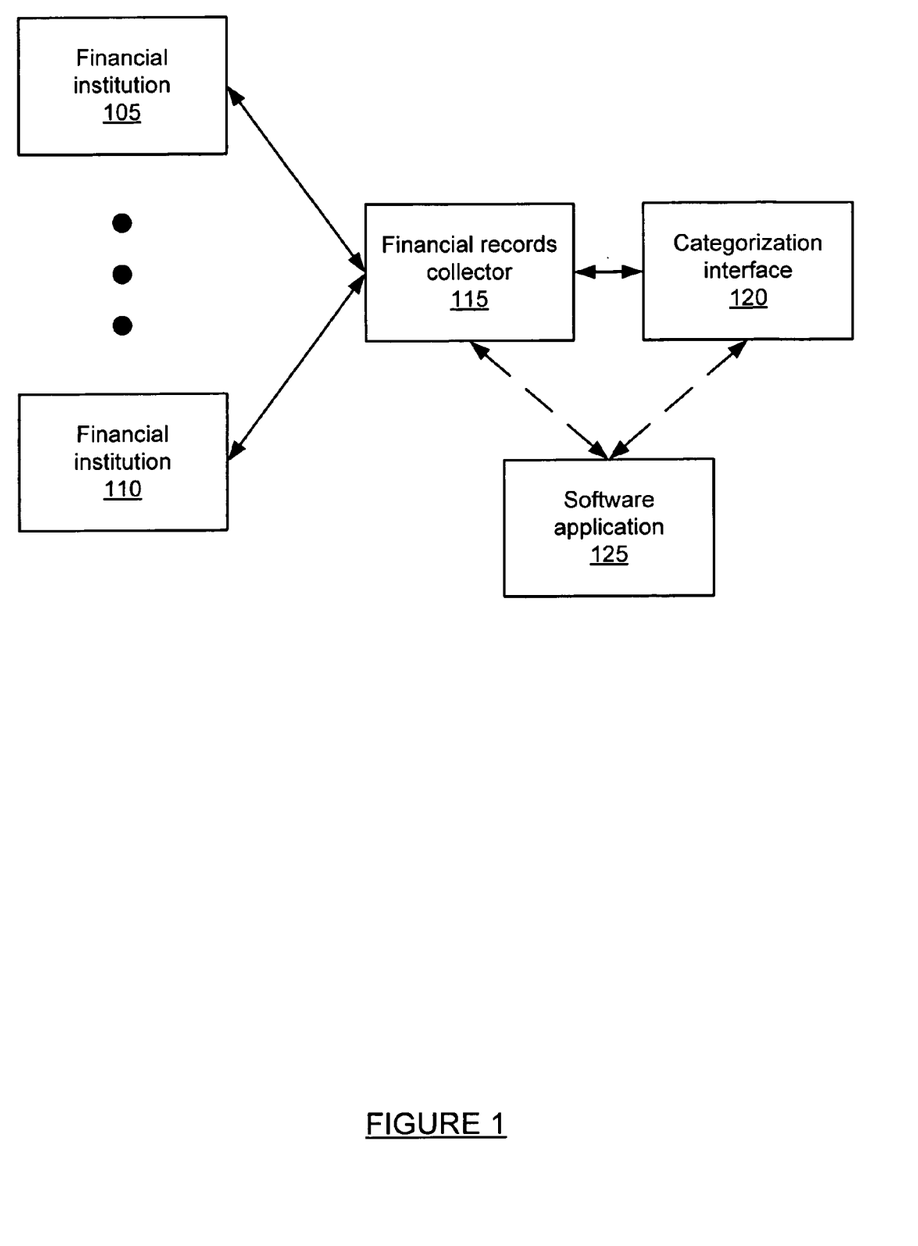
FIG. 1 shows a diagram of a system in accordance with one or more embodiments of the invention.

In one or more embodiments of the invention, financial records needing to be categorized may be obtained from one or more financial institutions. FIG. 1 shows a diagram of a system in accordance with one or more embodiments of the invention. Specifically, FIG. 1 shows a diagram of a system for categorizing financial records from one or more financial institutions (e.g., 105, 110), in accordance with one or more embodiments of the invention.

As shown in FIG. 1, in one or more embodiments of the invention, a financial records collector (115) may be configured to communicate with the financial institution(s) (e.g., 105, 110) to obtain financial records (not shown). In one or more embodiments of the invention, the financial records collector (115) may be a network server (i.e., a server operating on a wide area network (WAN), a local network (LAN), or any other type of private or public network), a software application executing on an end-user's computer system, or any other type of hardware or software module configured to obtain financial records from the financial institution(s) (e.g., 105, 110). More specifically, in one or more embodiments of the invention, the financial records collector (115) may be a web server configured to serve web pages over the Internet (or other network), or a server configured to communicate the financial records, directly or indirectly, to a web server. Those skilled in the art will appreciate that, in one or more embodiments of the invention, the financial records collector (115) includes functionality to facilitate consolidation of financial records from multiple financial institutions (e.g., 105, 110).

In one or more embodiments of the invention, the financial records obtained by the financial records collector (115) may then be presented to a user in a categorization interface (120). More specifically, the categorization interface (120) may be used to categorize the financial records. Categorization of financial records is discussed in detail below. In one or more embodiments of the invention, the categorization interface (120) may be a web page, a software application executing on a user's computer system (e.g., financial management software, tax preparation software, etc.), an electronic message (e.g., e-mail, text message, etc.), or any other type of interface for presenting the financial records.

Further, in one or more embodiments of the invention, the financial records collector (115) and/or categorization interface (120) may be integrated with a software application (125). For example, in one or more embodiments of the invention, the software application (125) may be financial management software, tax preparation software, or any other similar type of software. Those skilled in the art will appreciate that integration of the financial records collector (115) and/or categorization interface (120) with the software application (125) may involve communicating via a network protocol, a shared database (not shown), application program interface (API) calls, or any other type of software integration.

Figure 2:
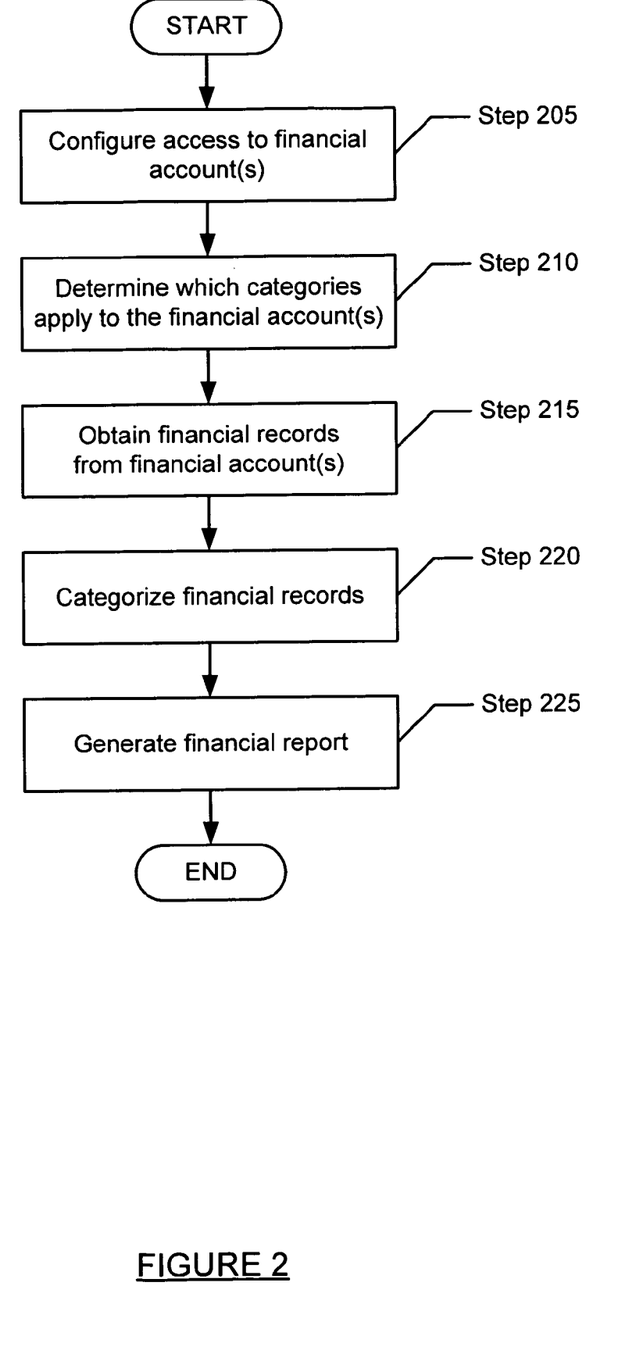
FIGS. 2-5 show flow charts in accordance with one or more embodiments of the invention.

FIG. 2 shows a flow chart in accordance with one or more embodiments of the invention. Specifically, FIG. 2 shows a flow chart of a method for generating a financial report, in accordance with one or more embodiments of the invention. Initially, access to one or more financial accounts is configured (Step 205). Next, a determination is made about which categories (i.e., business-related and/or non-business-related categories) apply to the financial account(s) (Step 210). Financial records from the financial account(s) are subsequently obtained (Step 215) and categorized (Step 220). After the financial records are categorized, a financial report is generated using the categorizations (Step 225). Each of these steps is discussed in further detail below. Those skilled in the art will appreciate that the method shown in FIG. 2 provides a convenient means for categorizing financial records in preparation for a tax filing, especially in cases where a financial account contains business-related financial records and non-business-related financial records, or when financial records for a small business are spread across multiple financial accounts.

Figure 3:
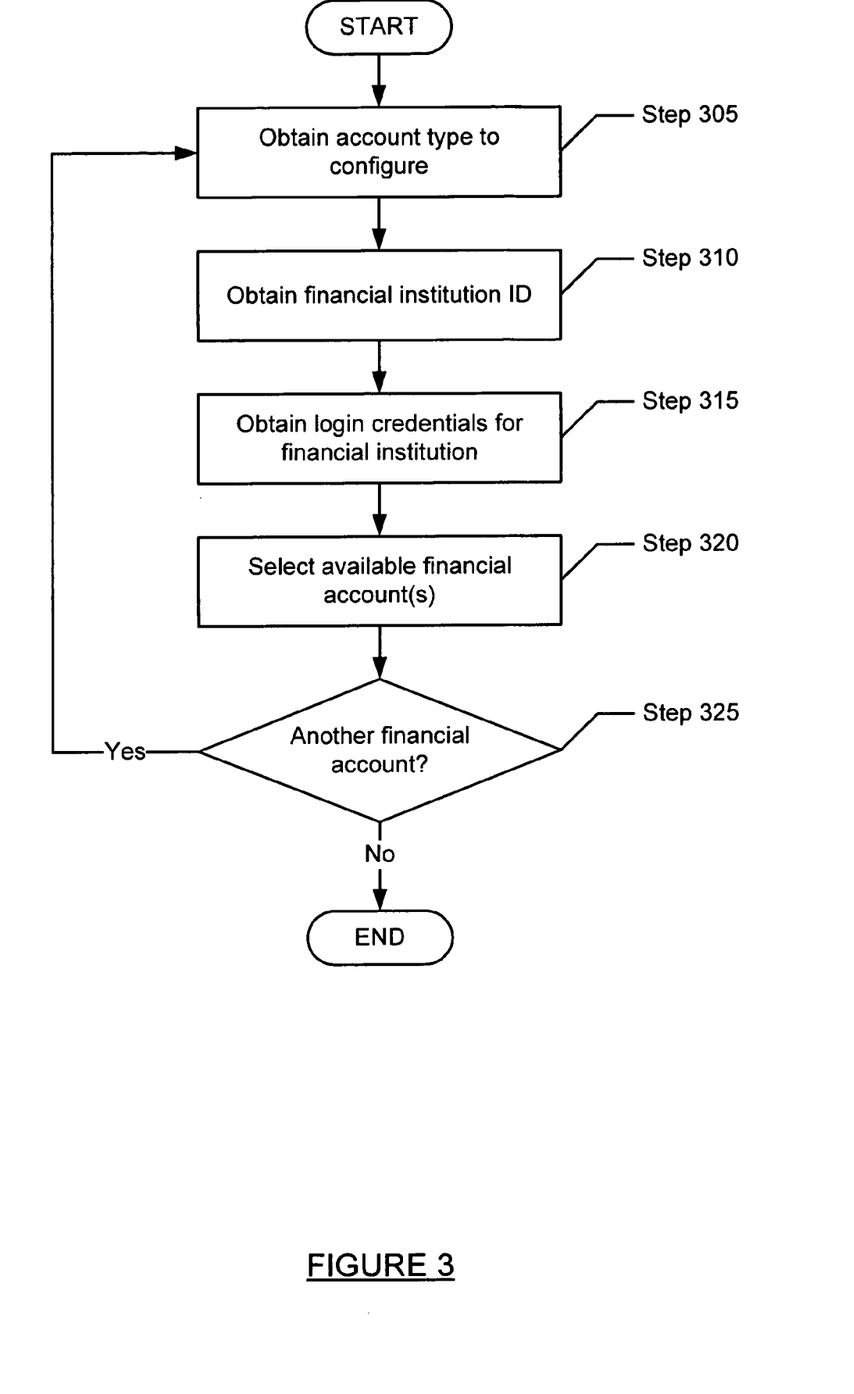

FIG. 3 shows a flow chart in accordance with one or more embodiments of the invention. Specifically, FIG. 3 shows a flow chart of a method for configuring access to one or more financial accounts (e.g., Step 205 of FIG. 205), in accordance with one or more embodiments of the invention. Initially, an account type to configure is obtained (Step 305). In one or more embodiments of the invention, the account type may be checking, credit card, money market, equity, or any other type of financial account. In one or more embodiments of the invention, the account type may be obtained using a dropdown menu, a text box, a checkbox, a radio button, a menu, a voice command, an automated programmatic lookup (e.g., a query issued to a database or database or software application), or by any other similar means.

Next, a financial institution identification (ID) is obtained (Step 310). In one or more embodiments of the invention, the financial institution ID may be a name of the financial institution, a branch number of the financial institution, a unique character string associated with the financial institution, any other type of identification, or any combination thereof. In one or more embodiments of the invention, the financial institution ID may be obtained using a dropdown menu, a textbox, a checkbox, a radio button, a menu, a voice command, an automated programmatic lookup (e.g., a query issued to a database or software application), or by any other similar means.

Those skilled in the art will appreciate that, in one or more embodiments of the invention, financial institution IDs available to obtain may be filtered based on the account type selected in Step 305. For example, if an account type of "checking" is obtained in Step 305, then IDs of financial institutions that do not offer checking accounts may not be available to obtain in Step 310. Though not shown in FIG. 3, in one or more embodiments of the invention, if the financial institution ID obtained is not supported (e.g., if the financial institution does not support obtaining financial records in the manner discussed below), then the method proceeds directly to Step 325, discussed in detail below.

Returning to discussion of FIG. 3, login credentials for the financial institution are subsequently obtained (Step 315). In one or more embodiments of the invention, the login credentials may be obtained using a dropdown menu, a textbox, a checkbox, a radio button, a menu, a voice command, an automated programmatic lookup (e.g., a query issued to a database or software application), or by any other similar means. Those skilled in the art will appreciate that, in one or more embodiments of the invention, the login credentials obtained may be based on the account type obtained in Step 305 and/or the financial institution ID obtained in Step 310.

Next, one or more available financial accounts is selected (Step 320). In one or more embodiments of the invention, selecting an available financial account may involve querying the financial institution using the login credentials obtained in Step 315, to obtain a list of available financial accounts. Further, in one or more embodiments of the invention, the financial accounts available to select may be limited to those financial accounts of the type selected in Step 305. In one or more embodiments of the invention, if only a single financial account is available to select, then the financial account may be automatically selected and the method may proceed directly to Step 325, discussed in detail below. In one or more embodiments of the invention, the financial account(s) may be selected using a dropdown menu, a textbox, a checkbox, a radio button, a menu, a voice command, an automated programmatic lookup (e.g., a query issued to a database or software application), or by any other similar means.

In one or more embodiments of the invention, access to multiple financial accounts may be configured. Accordingly, after access to a financial account has been configured, a determination may be made whether to configure access to another financial account (Step 325). In one or more embodiments of the invention, the determination may be made using a dropdown menu, a textbox, a checkbox, a radio button, a menu, a voice command, an automated programmatic lookup (e.g., a query issued to a database or software application), or by any other similar means. If there are no more financial accounts to configure, then the method ends.

In one or more embodiments of the invention, when configuring access to a financial account, the user may be prompted to indicate an approximate percentage of transactions (e.g., a transaction volume and/or transaction amount percentage) for the financial account that are directed to business-related expenses and/or income (not shown). If the user's response coincides with configuration and/or historical transaction data for a financial account that has already been configured, then automatic categorization settings may be configured for the new account based on the data for the previously configured account. Automatic categorization is discussed in detail below.

Figure 4:
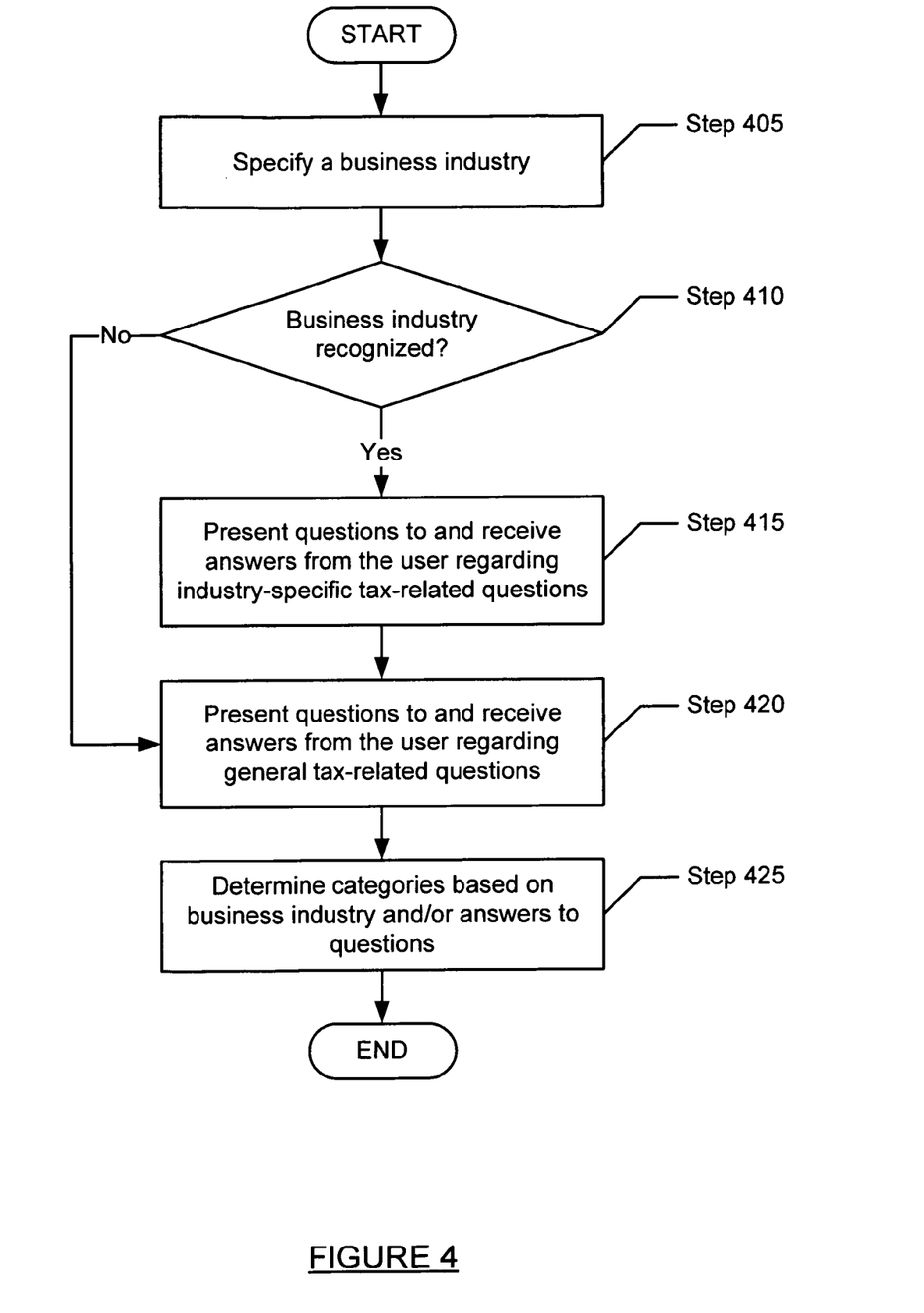

FIG. 4 shows a flow chart in accordance with one or more embodiments of the invention. Specifically, FIG. 4 shows a flow chart of a method for determining which categories apply to one or more financial accounts (e.g., Step 210 of FIG. 2), in accordance with one or more embodiments of the invention.

Initially, a business industry associated with the financial account(s) is specified (Step 405). In one or more embodiments of the invention, the business industry may be advertising (e.g., network marketing), agriculture, automotive services (e.g., trucking, sales, repairs, etc.), biotechnology, construction, consulting (e.g., management, human resources, training, information services, etc.), e-commerce, education, entertainment, financial services, food services, healthcare, hospitality, international business, legal services, manufacturing, media (e.g., print, radio, television, Internet, publishing, etc.), mining, oil services (e.g., drilling, gas distribution, etc.), pharmaceutical, property maintenance (e.g., gardening, plumbing, electrical, etc.), real estate (e.g., agents, brokers, etc.), retail, travel (e.g., travel agencies, transportation services, etc.), software development, or any other type of business industry. In one or more embodiments of the invention, the business industry may be specified using a dropdown menu, a textbox, a checkbox, a radio button, a menu, a voice command, an automated programmatic lookup (e.g., a query issued to a database or software application), or by any other means.

Next, a determination is made whether the business industry selected is recognized (Step 410)—i.e., whether industry-specific tax-related questions are available for the selected business industry. In one or more embodiments of the invention, the determination may be made by consulting a database, a network resource, a software application, or by any other similar means. In one or more embodiments of the invention, when a business industry is specified in Step 405, only recognized business industries may be available to specify. Accordingly, in one or more embodiments of the invention, Step 410 may not be performed.

In one or more embodiments of the invention, if Step 410 is performed and the business industry is not recognized, then the method proceeds directly to Step 420, discussed in detail below. Alternatively, if the business industry is recognized, then industry-specific tax-related questions are presented to and subsequently answered by the user (Step 415). In one or more embodiments of the invention, the industry-specific tax-related questions may include questions about vehicle use, rent, mortgages, utilities, clientele, business partners, or any other similar type of question. Those skilled in the art will appreciate that the industry-specific tax-related questions are questions associated with the specific business industry specified. Further, those skilled in the art will appreciate that multiple business industries may have industry-specific tax-related questions in common. In one or more embodiments of the invention, the questions may be answered using a dropdown menu, a textbox, a checkbox, a radio button, a menu, a voice command, an automated programmatic lookup (e.g., a query issued to a database or software application), or by any other similar means.

Next, general tax-related questions are presented to and subsequently answered by the user (Step 420). In one or more embodiments of the invention, the general tax-related questions may include questions about vehicle use, rent, mortgages, utilities, clientele, business partners, or any other type of question. Those skilled in the art will appreciate that the general tax-related questions are questions that may be applicable/common to a significant percentage of business industries. In one or more embodiments of the invention, the questions may be answered using a dropdown menu, a textbox, a checkbox, a radio button, a menu, a voice command, an automated programmatic lookup (e.g., a query issued to a database or software application), or by any other similar means. Those skilled in the art will appreciate that, in one or more embodiments of the invention, the industry-specific tax-related questions of Step 415 and the general tax-related questions of Step 420 may be combined and presented to and answered by the user in any order.

Based on the business industry specified and/or the answers to the tax-related questions (i.e., the industry-specific and/or general tax-related questions), categories are subsequently determined for the financial account(s) (Step 425) (i.e., categories that may later be used to categorize financial records, as discussed in further detail below). For example, in one or more embodiments of the invention, if an answer to a question indicates that a small business uses a vehicle for business purposes, then a vehicle expenses category may be used. As another example, if the business industry selected typically involves frequent travel, then a travel expenses category may be used. Those skilled in the art will appreciate that many different ways to determine categories based on a business industry and/or answers to tax-related questions exist. For example, in one or more embodiments of the invention, a pre-determined list of categories may exist for each recognized business industry—i.e., a list including at least one business-related category based on the business industry specified. Further, in one or more embodiments of the invention, if a pre-determined list of categories is used, the list may be modified based on the answers to the tax-related questions. Those skilled in the art will appreciate that some or all of the categories may be general business-related categories—i.e., categories that are not based on the business industry specified.

For example, in one or more embodiments of the invention, the business industries "truckers," "real estate agents," and/or "network marketing" may be available to specify. In one or more embodiments of the invention, if the business industry "truckers" is specified, then the business-related categories "claims & damages," "lumpers," and/or "tolls/scales/prepass" may be used. In one or more embodiments of the invention, if the business industry "real estate agents" is specified, then the business-related categories "client gifts," "showing expenses," "broker fees," and/or "education" may be used.

In one or more embodiments of the invention, if the business industry "network marketing" is specified, then the business-related categories "promotions & contests," "demonstration expenses," "shipping & postage," and/or "event registration fees" may be used. An example of how these business-related categories may be mapped to tax categories, in accordance with one or more embodiments of the invention, is provided in FIG. 6, discussed in detail below. Those skilled in the art will appreciate that the aforementioned business industries and business-related categories are provided for exemplary purposes only and should not be construed as limiting the scope of the invention.

Those skilled in the art will appreciate that, in one or more embodiments of the invention, categories provided to a user for categorizing financial records (e.g., categories determined as discussed above) may be user-friendly categories. In other words, the categories may be easier for a user to understand than tax categories, thereby allowing the user to more easily categorize financial records correctly. More specifically, because the user-friendly categories may be mapped to specific tax categories, as described in further detail below, a user may be able to identify the correct tax categories for financial records without dealing with the tax categories directly.

Figure 5:
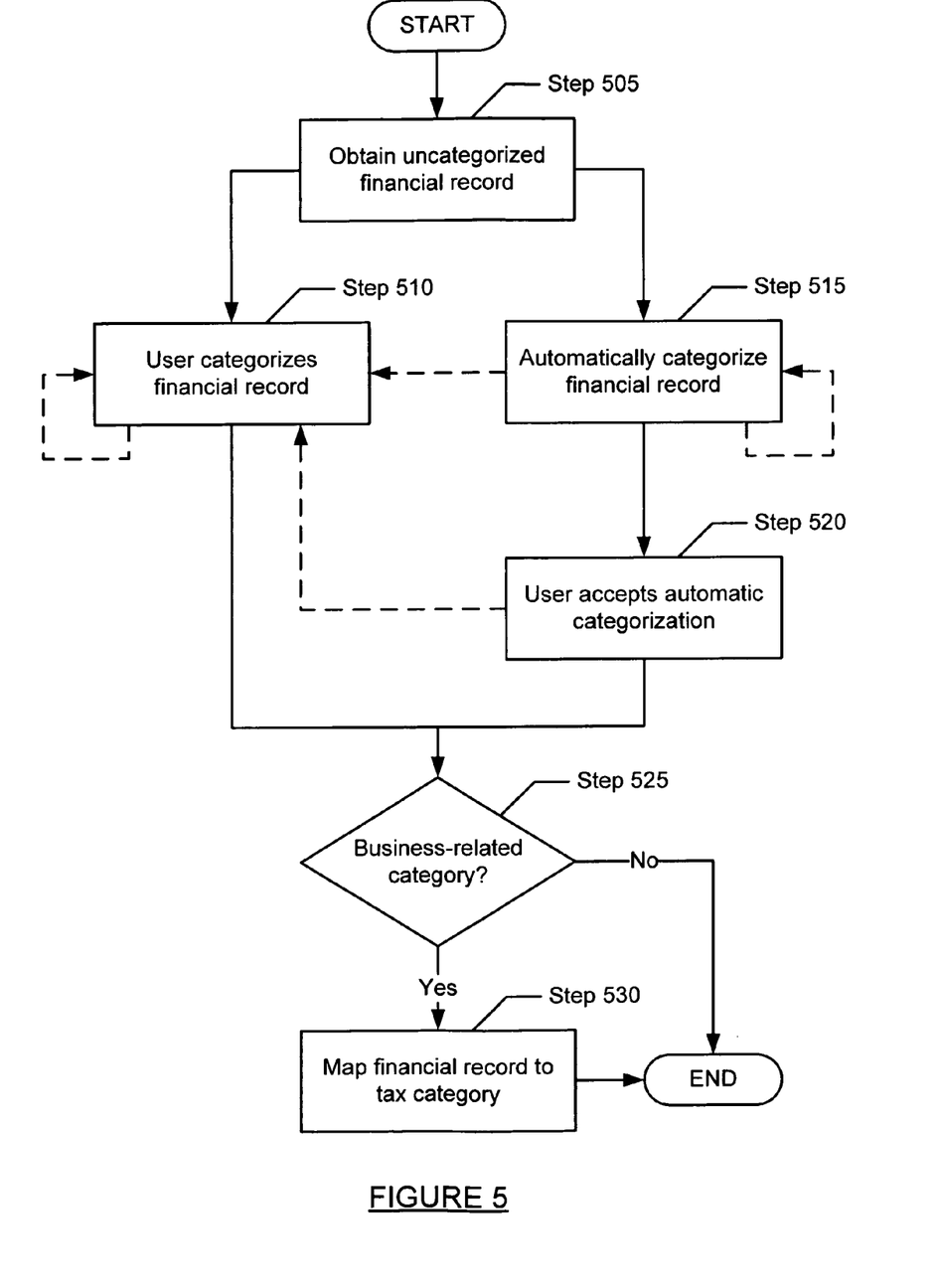

FIG. 5 shows a flow chart in accordance with one or more embodiments of the invention. Specifically, FIG. 5 shows a flow chart of a method for categorizing a financial record (e.g., Step 220 of FIG. 2), in accordance with one or more embodiments of the invention. In one or more embodiments of the invention, categorizing a financial record involves selecting a business-related category or a non-business-related category to associate with the financial record. More specifically, in one or more embodiments of the invention, multiple business-related categories are available to select and at least one non-business-related category is available to select. Examples of business-related categories are provided below. In one or more embodiments of the invention, each business-related category is associated with a tax category. Accordingly, each financial record categorized using a business-related category may then be mapped to the corresponding tax category. Mapping a financial record to a tax category is discussed in further detail below.

As shown in FIG. 5, initially, an uncategorized financial record is obtained (Step 505). For example, the financial record may be obtained from a financial account associated with a financial institution (e.g., Step 215 of FIG. 2).

In one or more embodiments of the invention, the financial record may be obtained in response to a user-issued command, in accordance with a predetermined schedule for obtaining financial records, upon configuring access to a financial account (e.g., upon completing Step 205 of FIG. 2), upon determining which categories to apply to the financial account (e.g., upon completing Step 210 of FIG. 2), or at any other time prior to categorizing the financial records. In one or more embodiments of the invention, the financial records may be obtained by a software application executing on a user's computer system (e.g., financial management software, tax preparation software, etc.), software executing on a network server (e.g., the financial records collector (115) of FIG. 1), or any other type of hardware or software module configured to obtain financial records from a financial institution.

In one or more embodiments of the invention, some of the financial records retrieved from the financial institution(s) may already be associated with categories (e.g., categories provided by a financial institution, by a user of a separate interface (not shown) provided by the financial institution, by a transaction partner associated with the particular financial record, etc.). Alternatively, in one or more embodiments of the invention, all of the financial records retrieved from the financial institution(s) may be uncategorized. Those skilled in the art will appreciate that even if a financial record is already associated with a category, the category may not correspond to a category used by the present invention. Accordingly, in one or more embodiments of the invention, even if a financial record is already associated with a category, the following categorization method may still be required.

Returning to discussion of FIG. 5, after the financial record is obtained, the financial record may then be categorized by a user (Step 510). In one or more embodiments of the invention, categorization by a user may be performed using a dropdown menu, a textbox, a checkbox, a radio button, a menu, a voice command, or any other similar type of user input. Those skilled in the art will appreciate that after the user has categorized the financial record, in one or more embodiments of the invention, the user may subsequently re-categorize the financial record (i.e., Step 510 may be repeated).

Alternatively, in one or more embodiments of the invention, the financial record may be categorized automatically (Step 515). In one or more embodiments of the invention, automatic categorization may involve categorization based on historical data. For example, the financial record may be categorized based on a categorization trend associated with previously categorized financial records. More specifically, in one or more embodiments of the invention, the financial record may be categorized based on having one or more characteristics (e.g., transaction amount, transaction partner, transaction time, etc.) in common with the previously categorized financial records. Different characteristics of financial records are discussed in detail below. Further, as discussed above, in one or more embodiments of the invention, automatic categorization may be based, in full or in part, on a percentage of transactions (i.e., transactions for the financial account with which the financial record is associated) that are directed to business-related expenses and/or income.

In one or more embodiments of the invention, the automatic categorization may be performed by a software application executing on a user's computer system (e.g., financial management software, tax preparation software, etc.), software executing on a network server (e.g., the financial records collector (115) of FIG. 1), or any other similar type of hardware or software module configured to perform an automatic categorization.

In one or more embodiments of the invention, after the financial record is automatically categorized, the financial record may be automatically re-categorized (i.e., Step 515 may be repeated). For example, the financial record may subsequently be automatically re-categorized based on an update to a process performing the categorization, newly available data (e.g., categorizations of other financial records, defining a new categorization trend), a user-selected categorization preference, or any other factor.

Further, in one or more embodiments of the invention, after the financial record is automatically categorized (i.e., after a first or subsequent instance of Step 515), a user may categorize the financial record using a different category (Step 510). Alternatively, the user may accept the automatic categorization (Step 520). In one or more embodiments of the invention, even after accepting the automatic categorization, the user may still categorize the financial record using a different category (Step 510).

After the user has accepted an automatic categorization (Step 520) and/or categorized the financial record (Step 510), a determination is made whether the financial record is associated with a business-related category (Step 525). Alternatively, in one or more embodiments of the invention, financial records associated with business-related categories may be stored separately from financial records associated with non-business-related categories. Those skilled in the art will appreciate that in this case, Step 525 may not be required.

In one or more embodiments of the invention, if the financial record is not associated with a business-related category, no additional categorization steps are taken. Alternatively, if the financial record is associated with a business-related category, then the financial record is mapped to a tax category, based on the business-related category (Step 525). More specifically, in one or more embodiments of the invention, the tax category that the financial record is mapped to indicates how the financial record should be used when filing a tax form. Tax categories are discussed in detail below.

In one or more embodiments of the invention, the mapping may be performed by a software application executing on a user's computer system (e.g., financial management software, tax preparation software, etc.), software executing on a network server (e.g., the financial records collector (115) of FIG. 1), or any other type of hardware or software module configured to perform mapping of a financial record to a tax category. Those skilled in the art will appreciate that, in one or more embodiments of the invention, the mapping may simply be a lookup of a predetermined association between a business-related category and a tax category.

In one or more embodiments of the invention, the tax form with which the mapping is associated may be a tax form provided by a government entity, such as the Internal Revenue Service (IRS). Further, in one or more embodiments of the invention, the tax form may be a tax form for sole proprietorships (e.g., IRS Form 1040, Schedule C), supplemental income and loss (e.g., IRS Form 1040, Schedule E), S corporations (e.g., IRS Form 1020S), partnerships (e.g., IRS Form 1065), or any other type of small business.

Those skilled in the art will appreciate that, in one or more embodiments of the invention, one or more of the aforementioned steps (i.e., the steps shown in FIGS. 2-5 individually, collectively, or in any sub-combination) may be performed in a different order than the order shown in FIGS. 2-5. Further, in one or more embodiments of the invention, one or more of the steps shown in FIGS. 2-5 may be omitted. Additionally, in one or more embodiments of the invention, one or more of the steps shown FIGS. 2-5 may be interspersed. Those skilled in the art will appreciate that many different ways to order, omit, and/or intersperse the steps shown in FIGS. 2-5 exist. Accordingly, the specific arrangement of the steps shown in FIGS. 2-5 should not be construed as limiting the scope of the invention.

Figure 6:
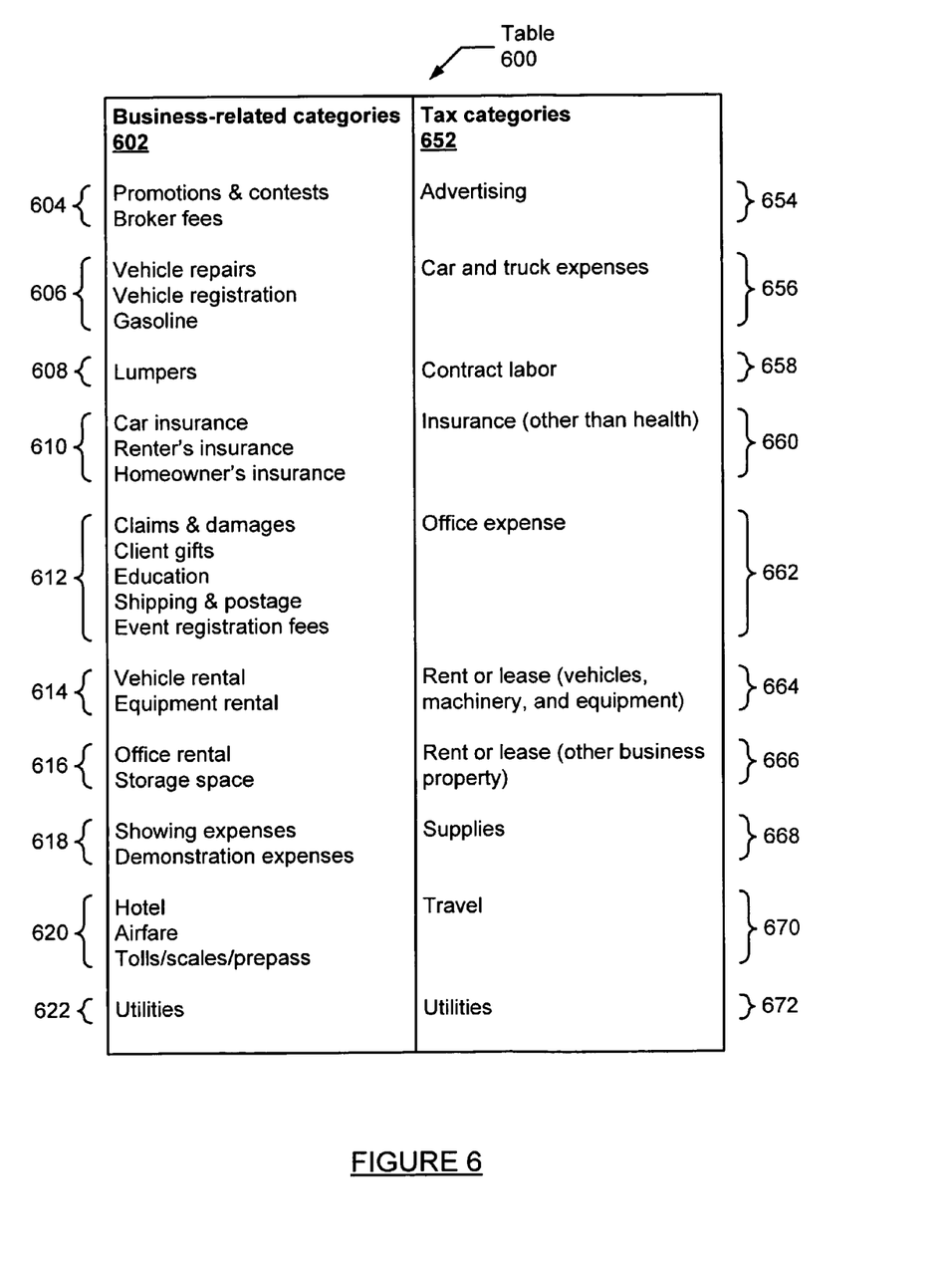
FIG. 6 shows a table of mappings in accordance with one or more embodiments of the invention.

FIG. 6 shows a table of mappings in accordance with one or more embodiments of the invention. Specifically, the table shown in FIG. 6 is an example of how business-related categories (e.g., 602) may be mapped to tax categories (e.g., 652), in accordance with one or more embodiments of the invention.

In one or more embodiments of the invention, multiple business-related categories may be mapped to a single tax category. For example, in FIG. 6, the groups of business-related categories (604, 606, 610, 612, 614, 616, 618, 620) are mapped to the tax categories (654, 656, 660, 662, 664, 666, 668, 670), respectively. Further, in one or more embodiments of the invention, a single business-related category may be mapped to a single tax category. For example, in FIG. 6, the business-related categories (608, 622) are mapped to the tax categories (658, 672), respectively. Those skilled in the art will appreciate that any number of business-related categories may be mapped to a single tax category.

As shown in FIG. 6, in one or more embodiments of the invention, business-related categories may be named differently from their corresponding tax categories. Further, as shown in FIG. 6, business-related categories may have the same name as their associated tax categories. For example, in FIG. 6, the business-related category (622) has the same name as its corresponding tax category (672). Those skilled in the art will appreciate that the business-related categories, tax categories, and mappings shown in FIG. 6 are provided for exemplary purposes only, and should not be construed as limiting the scope of the invention.

Figure 7:
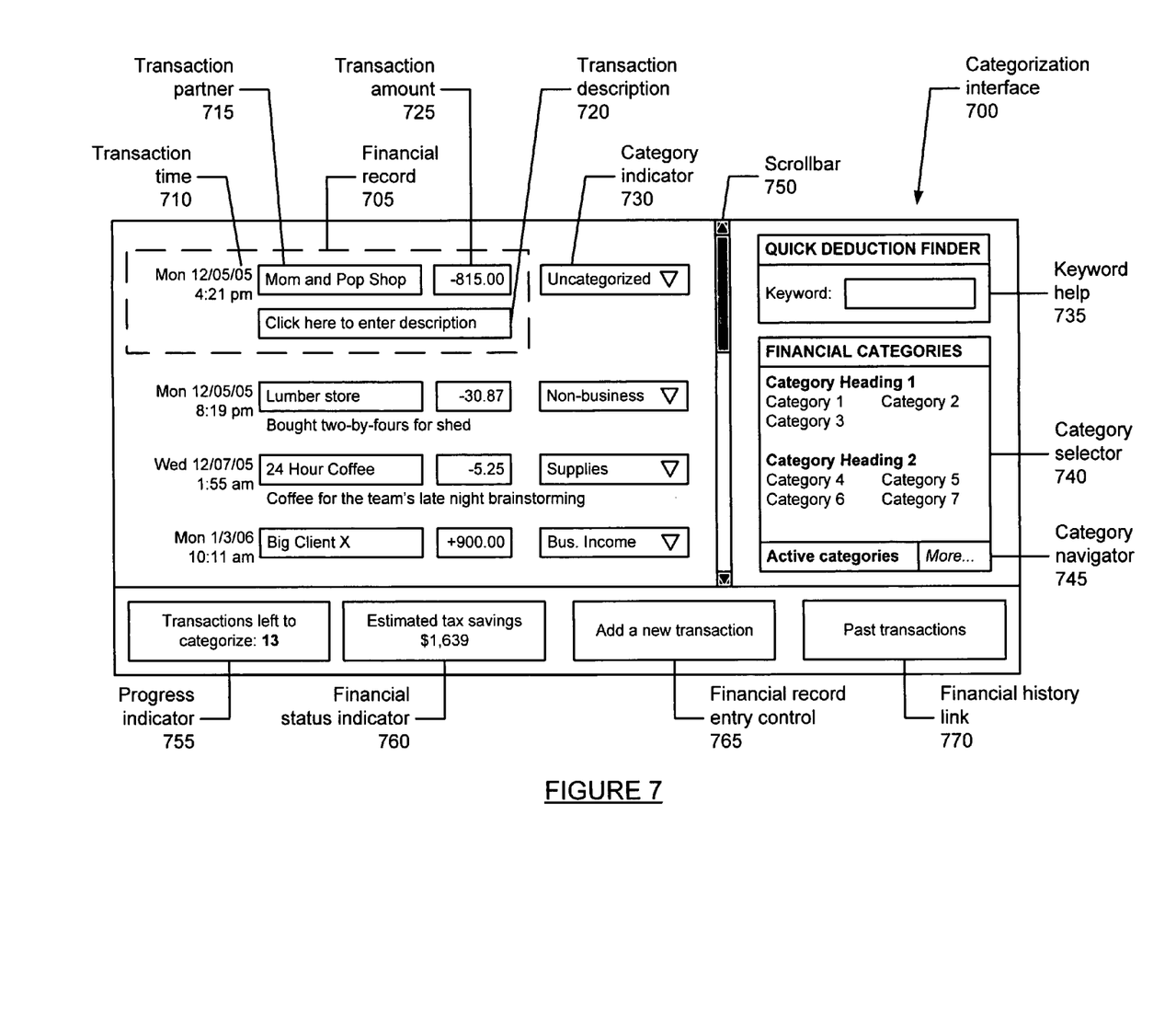
FIGS. 7-8 show diagrams of graphical user interfaces in accordance with one or more embodiments of the invention.

In one or more embodiments of the invention, financial records may be categorized (e.g., some or all of the steps of FIG. 5) using a graphical user interface. FIG. 7 shows a diagram of a graphical user interface in accordance with one or more embodiments of the invention. Specifically, FIG. 7 shows a diagram of a categorization interface (700), in accordance with one or more embodiments of the invention. Those skilled in the art will appreciate that the categorization interface (700) shown in FIG. 7 may correspond to the categorization interface (120) of FIG. 1.

In one or more embodiments of the invention, the categorization interface (700) is configured to display one or more financial records (e.g., 705). Specifically, in one or more embodiments of the invention, each financial record (e.g., 705) corresponds to a financial transaction. Accordingly, in one or more embodiments of the invention, each financial record (e.g., 705) may include a transaction time (e.g., 710) indicating the time of the transaction, a transaction partner (e.g., 715) indicating an entity with which the financial transaction occurred, a transaction amount (e.g., 725) indicating an amount of the transaction, a transaction description (e.g., 720) providing textual details about the financial record (e.g., 705), or any other data associated with the financial record (e.g., 705).

Those skilled in the art will appreciate that, in one or more embodiments of the invention, one or more of the characteristics of a financial record (e.g., 705) described above may be omitted. Further, in one or more embodiments of the invention, one or more of these characteristics may not be present in the financial record (e.g., 705) as obtained from the financial institution. Accordingly, in one or more embodiments of the invention, the categorization interface (700) may provide a means to add and/or edit one or more of the characteristics. In one or more embodiments of the invention, a characteristic may be added and/or edited by selecting a specific location of the categorization interface (700) (e.g., an editable field associated with a financial record (e.g., 705)), using a separate interface (not shown), or by any other similar means. Those skilled in the art will appreciate that adding and/or editing one or more of these characteristics may provide for more reliable tracking of financial records (e.g., 705) and/or more informative financial reports. Such financial reports are discussed in detail below.

For example, as shown in FIG. 7, the categorization interface (700) may allow a user to add and/or edit the transaction description (e.g., 720) for a financial record (e.g., 705). Further, in one or more embodiments of the invention, the categorization interface (700) may provide functionality for editing the transaction amount (e.g., 725) associated with a financial record (e.g., 705). Those skilled in the art will appreciate that editing a transaction amount (e.g., 725) may allow a user to specify a portion of the transaction amount (e.g., 725) that is business-related, thereby providing for more accurate financial reports. In one or more embodiments of the invention, if a transaction amount (e.g., 725) is edited, then the categorization interface (700) may be configured to display both the edited transaction amount (not shown) and the original transaction amount (e.g., 725) in association with the financial record (e.g., 705).

Further, in one or more embodiments of the invention, each financial record (e.g., 705) may be associated with a category indicator (e.g., 730). Specifically, in one or more embodiments of the invention, the category indicator (e.g., 730) may be configured to display a category associated with the financial record (e.g., 705). Those skilled in the art will appreciate that the category indicator (e.g., 730) may indicate a business-related category or non-business-related category, as described above. In one or more embodiments of the invention, the category indicator (730) may be an un-editable text field or image, a list, a dropdown menu, a menu, an icon group, a textbox, or any other similar type of indicator and/or control. For example, the category indicator (730) may be a control for selecting a category, as described below.

In one or more embodiments of the invention, the categorization interface (700) may be used to select a business-related or non-business-related category for a financial record (e.g., 705). Accordingly, in one or more embodiments of the invention, the categorization interface may include a category selector (740) configured to select a category for the financial record (e.g., 705). In one or more embodiments of the invention, the category selector (740) may be a list, a dropdown menu, a menu, an icon group, a textbox, or any other similar type of control for selecting a category. Further, in one or more embodiments of the invention, the categorization interface (700) may include a category entry control (not shown) for entering a user-defined category. Those skilled in the art will appreciate that the category entry control may alternatively be displayed in a separate interface (not shown). Further, those skilled in the art will appreciate that functionality of the category indicator (730) and category selector (740) may be included in a single categorization control (not shown).

Further, in one or more embodiments of the invention, the categorization interface (700) may include a category navigator (745) configured to provide access to additional categories not initially available in the categorization interface (700). Those skilled in the art will appreciate that the categories initially available in the categorization interface (700) may be categories that are common to a significant number of business industries, categories that are specific to a business industry (e.g., a business industry selected for a financial account, as discussed above), one or more user-selected preferences, or any other filtering of available categories. Alternatively, in one or more embodiments of the invention, all categories may be initially available.

In one or more embodiments of the invention, the categorization interface (700) may include a keyword help (735) configured to accept a keyword and, based thereon, obtain advice associated with the keyword. In one or more embodiments of the invention, the keyword may be a business-related category, a tax category, a title of a tax form, or any other type of keyword. In one or more embodiments of the invention, the advice may be directed to usage of the categorization interface (700), a tax deduction, description of a business-related category and/or tax category, or any other type of advice. For example, in one or more embodiments of the invention, the advice may indicate a probable business-related category associated with the keyword. Further, in one or more embodiments of the invention, the advice may indicate a probable tax category associated with the keyword. Those skilled in the art will appreciate that many different types of advice for keywords exist.

Further, in one or more embodiments of the invention, the categorization interface (700) may include a progress indicator (755). Specifically, in one or more embodiments of the invention, the progress indicator (755) may be configured to display a number of financial records (e.g., 705) that have not yet been categorized, a number of financial records (e.g., 705) that have been categorized, or any other type of categorization progress. In one or more embodiments of the invention, the progress indicator (755) may include text, a number, an image, a progress bar, a percentage, or any other similar type of indicator.

Further, in one or more embodiments of the invention, the categorization interface (700) may include a financial status indicator (760). Specifically, as shown in FIG. 7, in one or more embodiments of the invention, the financial status indicator (760) may be configured to display a tax savings (or estimated tax savings) and/or tax liability (or estimated tax liability) based on categorization of one or more financial records (e.g., 705). Those skilled in the art will appreciate that many different ways to calculate or estimate a tax savings and/or tax liability based on categorization of financial records (e.g., 705) exist.

Further, in one or more embodiments of the invention, the categorization interface (700) may include a financial record entry control (765). Specifically, in one or more embodiments of the invention, the financial record entry control (765) may be configured to access an interface (not shown) for entering a financial record (e.g., 705) to be displayed in the categorization interface (700). Those skilled in the art will appreciate that a financial record (e.g., 705) thus entered may be a financial record that was not retrieved and/or not available from the financial institution(s)—i.e., not retrieved in the manner described above. However, in one or more embodiments of the invention, the financial record entry control (765) may provide functionality to retrieve additional financial records from the financial institution(s).

In one or more embodiments of the invention, the financial records (e.g., 705) displayed in the categorization interface (700) may only be those financial records (e.g., 705) that were not previously categorized, or financial records (e.g., 705) corresponding only to a particular range of transaction times (e.g., 710). Accordingly, in one or more embodiments of the invention, the categorization interface (700) may include a financial history link (770) configured to provide functionality for displaying financial records that have already been categorized and/or corresponding to a historical range of transaction times. In one or more embodiments of the invention, financial records accessed using the financial history link (770) may be displayed in the categorization interface (700) or in another interface (not shown).

Figure 8:
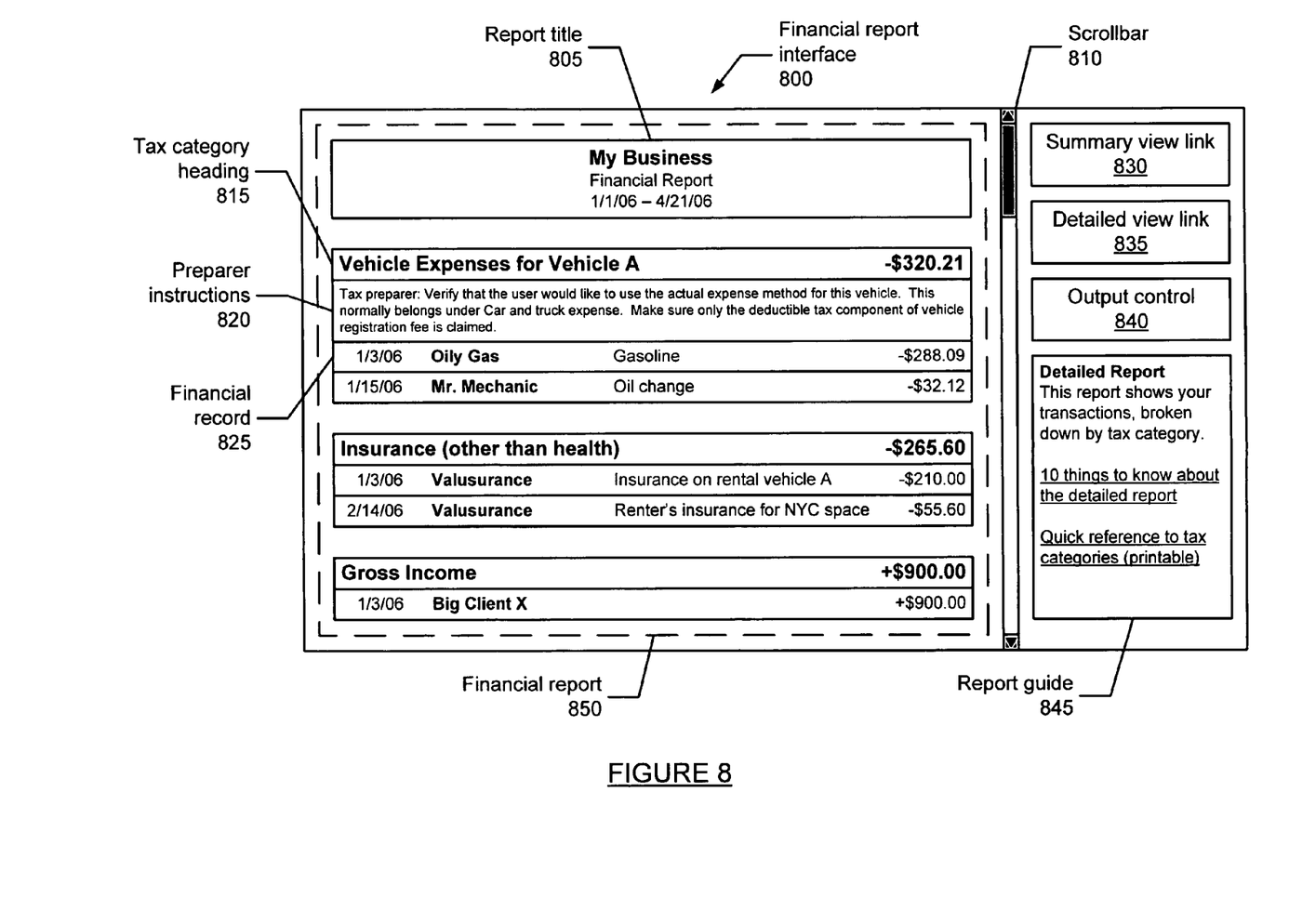

As described above, in one or more embodiments of the invention, after financial records are categorized, the categorizations are used to generate a financial report. FIG. 8 shows a graphical user interface in accordance with one or more embodiments of the invention. Specifically, FIG. 8 shows a financial report interface (800), in accordance with one or more embodiments of the invention. In one or more embodiments of the invention, the financial report interface (800) is configured to display a financial report (850).

In one or more embodiments of the invention, the financial report (850) may include a report title (805), configured to display a project and/or client name, a report description, one or more dates (e.g., a current date, earliest and latest dates of financial records (e.g., 825) included in the financial report, or any other type of date or date range), or any other type of information about the financial report (850) and/or financial report interface (800).

In one or more embodiments of the invention, the financial report (850) may include one or more financial records (e.g., 825). More specifically, in one or more embodiments of the invention, the financial records (e.g., 825) may be displayed in association with a tax category heading (e.g., 815), indicating a result of mapping each financial record (e.g., 825) from a business-related category (e.g., a business-related category selected using the categorization interface of FIG. 7) to a tax category. Further, in one or more embodiments of the invention, the tax category heading (e.g., 815) may include a transaction amount total for all of the financial records (e.g., 825) included in the tax category. Additionally, in one or more embodiments of the invention, the financial report (850) may include preparer instructions (e.g., 820) for one or more tax categories, providing information about how to use the financial report (850) when preparing a tax filing.

In one or more embodiments of the invention, every characteristic (e.g., transaction time, transaction partner, transaction amount, transaction description, etc.) of the financial records (e.g., 825) may be displayed in the financial report (850). Alternatively, in one or more embodiments of the invention, none or a subset of characteristics of the financial records (e.g., 825) may be displayed. Further, in one or more embodiments of the invention, the financial report interface (800) may include a summary view link (830) and/or a detailed view link (835), configured to modify the financial report (850).

In one or more embodiments of the invention, the summary view link (830) may be configured to modify the financial report (850) to include transaction amount totals for each tax category, without including specific characteristics of each financial record (e.g., 825). Conversely, in one or more embodiments of the invention, the detailed view link (835) may be configured to modify the financial report (850) to include one or more characteristics of individual financial records (e.g., 825) (e.g., as shown in FIG. 8). Those skilled in the art will appreciate that the summary view link (830) and/or detailed view link (835) may be configured to modify the financial report (850) to include any combination and/or subset of characteristics of financial records (e.g., 825). In one or more embodiments of the invention, the summary view link (830) and/or detailed view link (835) may be a hyperlink, a button, an icon, a menu item, a tab, or any other similar type of link.

In one or more embodiments of the invention, the financial report interface (800) may include an output control (840) configured to output the financial report (850). In one or more embodiments of the invention, the financial report (850) may be output to a printer, a portable document format (PDF) file, a text file, a network location, or any other type of output resource. Those skilled in the art will appreciate that when the output control (840) is selected, additional steps (e.g., using an output settings interface (not shown)) may be required prior to outputting the financial report (850). In one or more embodiments of the invention, the output control (840) may be a hyperlink, a button, an icon, a menu item, a tab, or any other similar type of control.

In one or more embodiments of the invention, the financial report (850), or the financial data (i.e., financial records (e.g., 825), etc.) represented therein, may be used by tax preparation software to automatically populate a tax form. Different types of tax forms are discussed in greater detail above. Accordingly, in one or more embodiments of the invention, the output control (840) may be configured to provide some or all of the financial data to tax preparation software. Those skilled in the art will appreciate that the categorization interface (e.g., 700 of FIG. 7), financial report interface (800), and aforementioned tax preparation software may be components of a single software package.

In one or more embodiments of the invention, the financial report interface (800) may include a report guide (845) configured to supply additional information about the financial report interface (800). More specifically, the report guide (845) may supply information about using the financial report interface (800), using the financial report (850) to prepare a tax filing, tax categories, or any other type of information. In one or more embodiments of the invention, the information may be supplied via one or more links displayed in the report guide (845). For example, the links may be hyperlinks, buttons, icons, menu items, tabs, or any other type of link.

Figure 9:
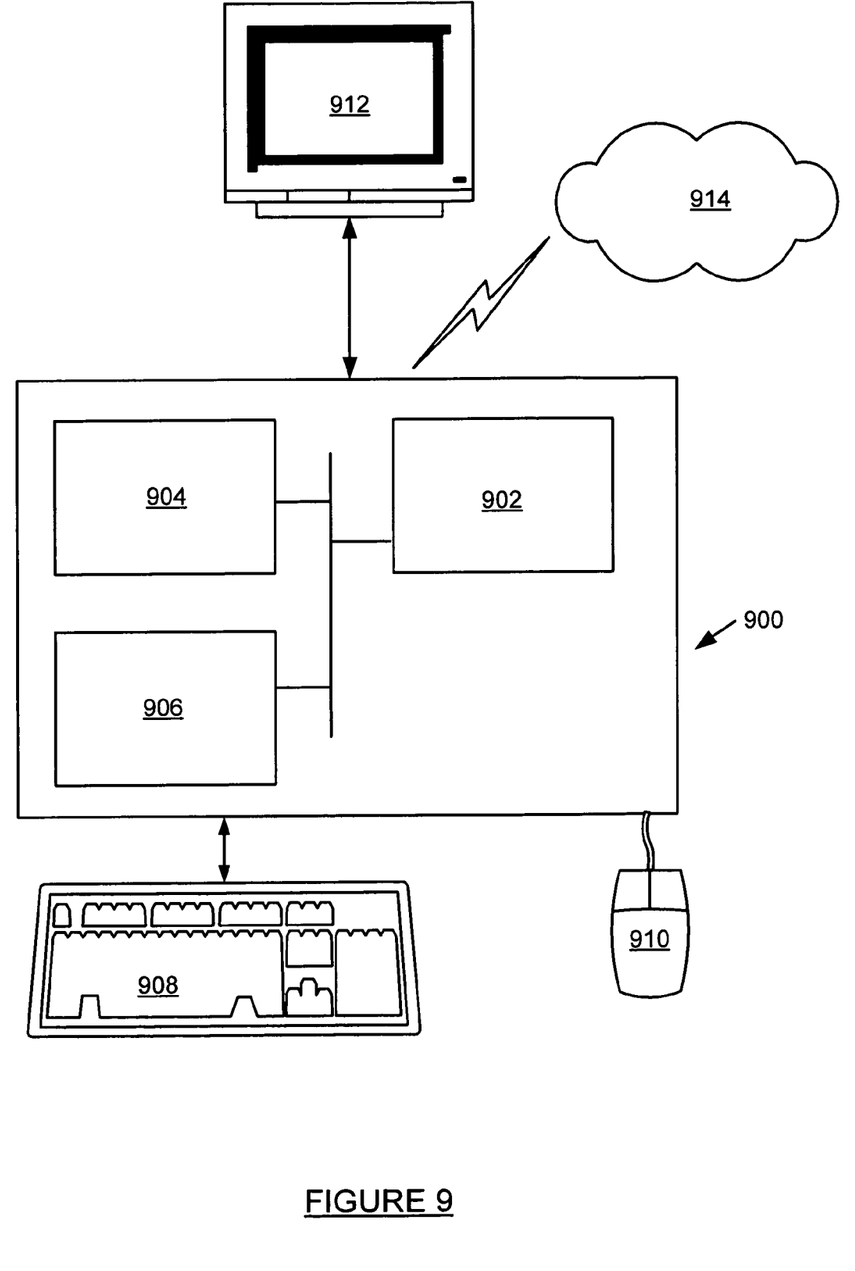
FIG. 9 shows a diagram of a computer system in accordance with one embodiment of the invention.

The invention may be implemented on virtually any type of computer regardless of the platform being used. For example, as shown in FIG. 9, a computer system (900) includes a processor (902), associated memory (904), a storage device (906), and numerous other elements and functionalities typical of today's computers (not shown), including mobile devices such as PDAs, cellular phones, and any other computing devices. The computer (900) may also include input means, such as a keyboard (908) and a mouse (910), and output means, such as a monitor (912). The computer system (900) may be communicatively coupled to a network (914), such as a local area network (LAN) or a wide area network (e.g., the Internet) via a network interface connection (not shown). Those skilled in the art will appreciate that these input and output means may take other forms.

Further, those skilled in the art will appreciate that one or more elements of the aforementioned computer system (900) may be located at a remote location and connected to the other elements over a network. Further, the invention may be implemented on a distributed system having a plurality of nodes, where each portion of the invention (e.g., financial institution(s), financial records collector, categorization interface, financial report interface, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for categorizing financial records of a business, comprising:
   identifying, from a plurality of business industries, a business industry of the business, wherein each of the plurality business industries has a distinct corresponding pre-determined list comprising a plurality of industry specific categories;
   selecting, by a software application using a processor, the plurality of industry specific categories corresponding to the business industry;
   obtaining, using the processor, a plurality of uncategorized financial records of the business from a plurality of financial institutions;
   for each uncategorized financial record in the plurality of uncategorized financial records, automatically categorizing, by the software application using the processor, the uncategorized financial record using a category selected from a plurality of categories to create a plurality of categorized financial records,
      wherein the plurality of categories comprises a plurality of business-related categories comprising the plurality of industry specific categories and at least one non-business-related category, and
      wherein, for at least one uncategorized financial record, the automatic categorization is based on a trend observed in previously categorized financial records, wherein the trend comprises characteristics of the at least one financial record being categorized that is in common with characteristics of previously categorized financial records;
   for each categorized financial record automatically categorized using a business-related category selected from the plurality of business-related categories, automatically mapping, by the software application using the processor, the categorized financial record to a tax category selected from a plurality of tax categories based upon a predetermined association between the business-related category and the tax category, wherein the tax category is associated with the business-related category, wherein at least two of the plurality of industry specific categories map to the same tax category;
   grouping the plurality of categorized financial records according to the plurality of tax categories to obtain a plurality of financial record tax category groups; and
   generating, using the processor and based upon the mapping, a financial report comprising the plurality of financial record tax category groups,
      wherein at least a portion of the plurality of uncategorized financial transaction records categorized according to the plurality of industry specific categories are expense transactions.

2. The method of claim 1, wherein the plurality of business-related categories further comprises a user-defined category.

3. The method of claim 1, wherein the plurality of financial records is associated with a sole proprietorship as defined by the Internal Revenue Service (IRS), and wherein the plurality of tax categories is defined for sole proprietorships.

4. An apparatus comprising:
   a computer and display device configured with a graphical user interface displaying a categorization interface, comprising:
      a plurality of categorized financial records of a business from a plurality of financial institutions,
         wherein the business is in a business industry of a plurality of business industries, wherein each of the plurality business industries has a distinct corresponding pre-determined list comprising a plurality of industry specific categories,
         wherein the plurality of categorized financial records are obtained as a plurality of uncategorized financial records from the plurality of financial institutions,
         wherein each uncategorized financial record in the plurality of uncategorized financial records are automatically categorized using a first category selected from a plurality of categories to create the plurality of categorized financial records, wherein the plurality of categories comprises a plurality of business-related categories comprising the plurality of industry specific categories corresponding to the business industry of the business and at least one non-business-related category, and
         wherein, for at least one uncategorized financial record, the automatic categorization is based on a trend observed in previously categorized financial records, wherein the trend comprises characteristics of the at least one financial record being categorized that is in common with characteristics of previously categorized financial records; and
      for each categorized financial record in the plurality of uncategorized financial records, a category selector configured to decline the automatic categorization of the categorized financial record and further configured to re-categorize the categorized financial record by associating the financial record with a second category selected from plurality of categories,
   wherein the categorized financial record associated with a first category selected from the plurality of business-related categories is automatically mapped to a tax category selected from a plurality of tax categories based on a predetermined association between the business-related category and the tax category, wherein the tax category is associated with the business-related category, wherein at least two of the plurality of industry specific categories map to the same tax category; and
   wherein a financial report generated based upon the mapping comprises a plurality of financial record tax category groups grouped according to the plurality of tax categories, and
   wherein at least a portion of the plurality of uncategorized financial transaction records categorized according to the plurality of industry specific categories are expense transactions.

5. The graphical user interface of claim 4, further comprising:

a keyword help configured to accept a keyword and, based thereon, obtain advice associated with a probable business-related category associated with the keyword.

6. The graphical user interface of claim 4, wherein the plurality of business-related categories further comprises a user-defined category.

7. The graphical user interface of claim 4, wherein the plurality of financial records is associated with a sole proprietorship as defined by the Internal Revenue Service (IRS), and wherein the plurality of tax categories is defined for sole proprietorships.

8. A system comprising:
a processor associated with a memory and a storage device;
a financial records collector configured to obtain a plurality of uncategorized financial records of a business from a plurality of financial institutions; and
a categorization interface configured to:
identifying, from a plurality of business industries, a business industry of the business, wherein each of the plurality business industries has a distinct corresponding pre-determined list comprising a plurality of industry specific categories;
automatically categorize each uncategorized financial record in the plurality of uncategorized financial records using a category selected from a plurality of categories to create a plurality of categorized financial records,
wherein the plurality of categories comprises a plurality of business-related categories and at least one non-business-related category, wherein the business-related categories comprises the plurality of industry specific categories corresponding to the business industry
wherein, for at least one uncategorized financial record, the automatic categorization is based on a trend observed in previously categorized financial records, wherein the trend comprises characteristics of the at least one financial record being categorized that is in common with characteristics of previously categorized financial records,
wherein each categorized financial record automatically categorized using a business-related category selected from the plurality of business-related categories is automatically mapped to a tax category selected from a plurality of tax categories based upon a predetermined association between the business-related category and the tax category, wherein the tax category is associated with the business-related category, wherein at least two of the plurality of industry specific categories map to the same tax category; and
wherein a financial report generated based upon the mapping comprises a plurality of financial record tax category groups grouped according to the plurality of tax categories, and
wherein at least a portion of the plurality of uncategorized financial transaction records categorized according to the plurality of industry specific categories are expense transactions.

9. The system of claim 8, wherein the plurality of business-related categories further comprises a user-defined category.

10. The system of claim 8, wherein the plurality of financial records is associated with a sole proprietorship as defined by the Internal Revenue Service (IRS), and wherein the plurality of tax categories is defined for sole proprietorships.

11. A computer readable non-transitory medium comprising executable instructions for categorizing financial records of a business by:
identifying, from a plurality of business industries, a business industry of the business, wherein each of the plurality business industries has a distinct corresponding predetermined list comprising a plurality of industry specific categories;
selecting the plurality of industry specific categories corresponding to the business industry;
obtaining a plurality of uncategorized financial records of the business from a plurality of financial institutions;
for each uncategorized financial record in the plurality of uncategorized financial records, automatically categorizing the uncategorized financial record using a category selected from a plurality of categories to create a plurality of categorized financial records, wherein the plurality of categories comprises a plurality of business-related categories comprising the plurality of industry specific categories and at least one non-business-related category, and
wherein, for at least one uncategorized financial record, the automatic categorization is based on a trend observed in previously categorized financial records, wherein the trend comprises characteristics of the at least one financial record being categorized that is in common with characteristics of each previously categorized financial record;
for each categorized financial record automatically categorized using a business-related category selected from the plurality of business-related categories, mapping the categorized financial record to a tax category selected from a plurality of tax categories based upon a predetermined association between the business-related category and the tax category, wherein the tax category is associated with the business-related category, wherein at least two of the plurality of industry specific categories map to the same tax category;
grouping the plurality of categorized financial records according to the plurality of tax categories to obtain a plurality of financial record tax category groups; and
generating, based upon the mapping, a financial report comprising the plurality of financial record tax category groups,
wherein at least a portion of the plurality of uncategorized financial transaction records categorized according to the plurality of industry specific categories are expense transactions.

12. The computer readable medium of claim 11, wherein the plurality of business-related categories further comprises a user-defined category.

13. The computer readable medium of claim 11, wherein the plurality of financial records is associated with a sole proprietorship as defined by the Internal Revenue Service (IRS), and wherein the plurality of tax categories is defined for sole proprietorships.

* * * * *